(12) United States Patent
Tsyrganovich

(10) Patent No.: US 7,170,239 B2
(45) Date of Patent: Jan. 30, 2007

(54) CIRCUIT AND METHOD FOR REDUCING EAST-WEST GEOMETRY MISMATCH BETWEEN THE TOP AND BOTTOM OF A RASTER DISPLAY

(75) Inventor: Anatoliy V. Tsyrganovich, San Jose, CA (US)

(73) Assignee: Zilog, Inc., San Jose, CA (US)

( * ) Notice: Subject to any disclaimer, the term of this patent is extended or adjusted under 35 U.S.C. 154(b) by 309 days.

(21) Appl. No.: 10/876,358

(22) Filed: Jun. 23, 2004

(65) Prior Publication Data

US 2005/0017660 A1    Jan. 27, 2005

Related U.S. Application Data

(63) Continuation-in-part of application No. 10/820,237, filed on Apr. 5, 2004, which is a continuation of application No. 10/003,824, filed on Oct. 31, 2001, now Pat. No. 6,717,377.

(51) Int. Cl.
*G09G 1/28* (2006.01)

(52) U.S. Cl. ................ 315/368.21; 315/371

(58) Field of Classification Search ........ 315/371, 315/381.11, 381.21, 382, 368.11, 368.21, 315/291, 307; 348/189
See application file for complete search history.

(56) References Cited

U.S. PATENT DOCUMENTS

| | | | |
|---|---|---|---|
| 4,063,134 A | 12/1977 | Iida | 315/371 |
| 4,305,023 A | 12/1981 | Willis | 315/371 |
| 4,395,662 A * | 7/1983 | Sexton, Jr. | 315/371 |
| 4,536,682 A | 8/1985 | ten Pierick | 315/387 |
| 4,683,405 A | 7/1987 | Truskalo et al. | 315/371 |
| 4,687,972 A | 8/1987 | Haferl | 315/371 |
| 4,689,526 A | 8/1987 | Schweer | 315/371 |
| 4,810,939 A | 3/1989 | Watanabe et al. | 315/371 |
| 5,051,608 A | 9/1991 | Ten Pierick et al. | 327/125 |
| 5,194,784 A | 3/1993 | Tripod | 315/371 |
| 5,218,275 A | 6/1993 | Truskalo | 315/368.21 |
| 5,323,092 A | 6/1994 | Helfrich et al. | 315/371 |
| 5,434,484 A | 7/1995 | Murakami | 315/371 |
| 5,449,982 A | 9/1995 | Ando | 315/371 |
| 5,475,286 A | 12/1995 | Jackson et al. | 315/371 |
| 5,532,765 A | 7/1996 | Inoue et al. | 348/807 |
| 5,583,400 A | 12/1996 | Hulshof et al. | 315/371 |
| 5,698,953 A * | 12/1997 | Shim | 315/371 |
| 5,977,728 A | 11/1999 | Kwon | 315/382 |
| 6,246,445 B1 | 6/2001 | Kwon | 348/687 |
| 6,583,814 B1 * | 6/2003 | Runtze et al. | 348/189 |
| 2003/0076425 A1 | 4/2003 | Yamate | |

* cited by examiner

*Primary Examiner*—Tuyet Vo
*Assistant Examiner*—Jimmy Vu
(74) *Attorney, Agent, or Firm*—Imperium Patent Works; Darien K. Wallace; T. Lester Wallace

(57) ABSTRACT

The present disclosure describes a technique for reducing east-west geometry mismatch between the top and bottom of a raster display. This is accomplished by generating a horizontal correction signal that does not have any discontinuities. Since there are no discontinuities in the horizontal correction signal, the horizontal deflection current signal will not be distorted. As a result, there will be no east-west geometry mismatch between the top and bottom of the raster display.

20 Claims, 10 Drawing Sheets

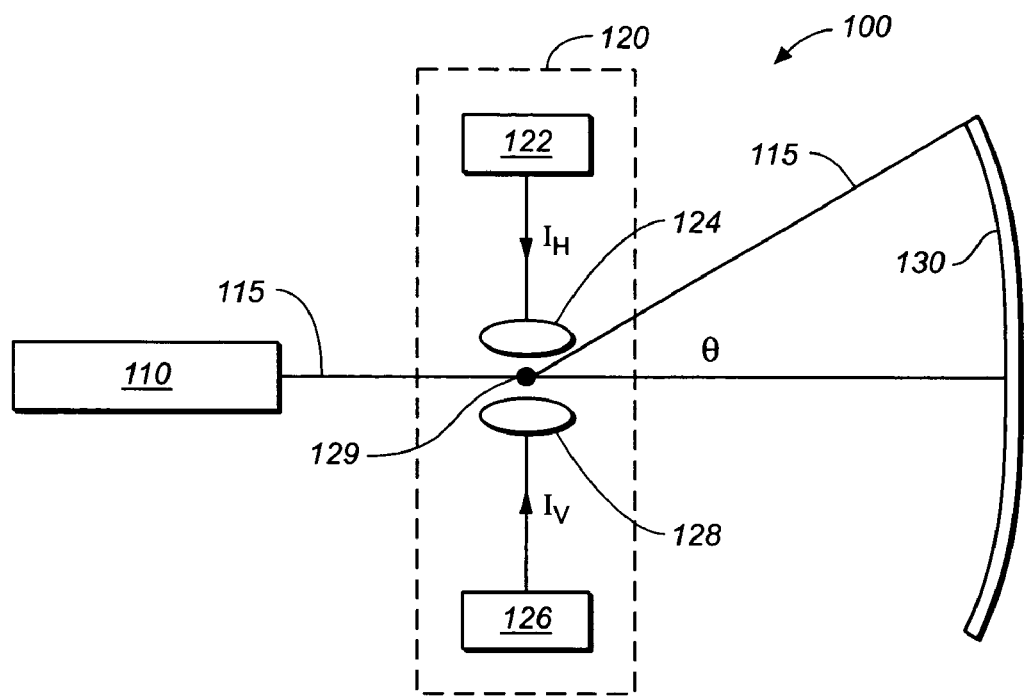
FIG._1A
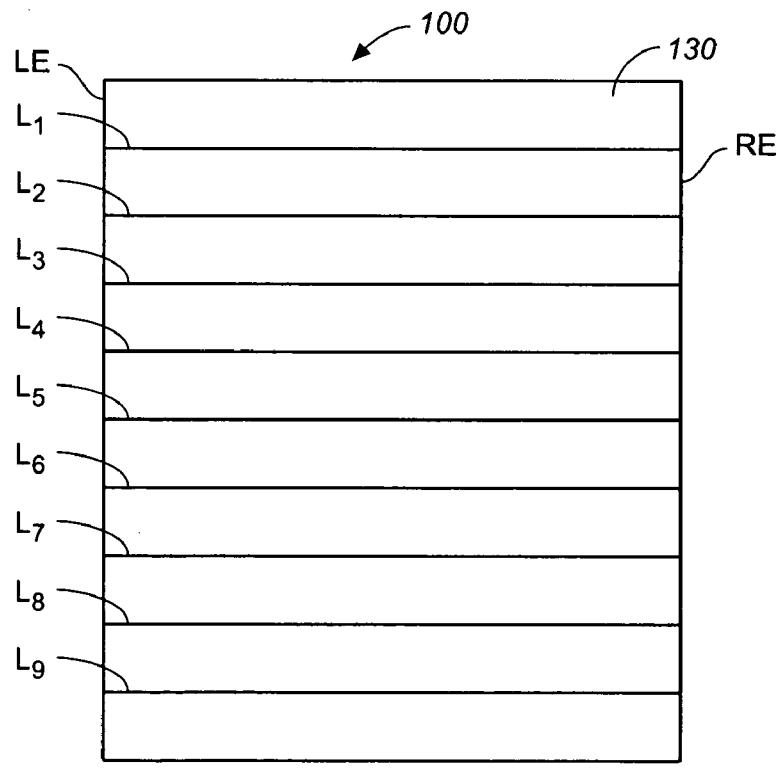
FIG._1B

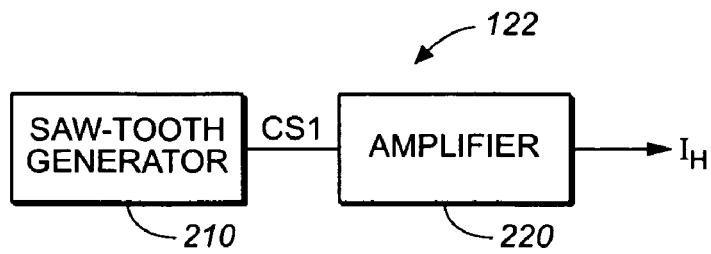
FIG._2A
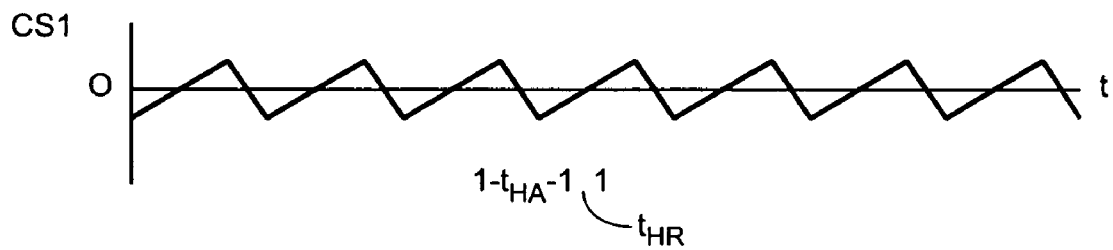
FIG._2B
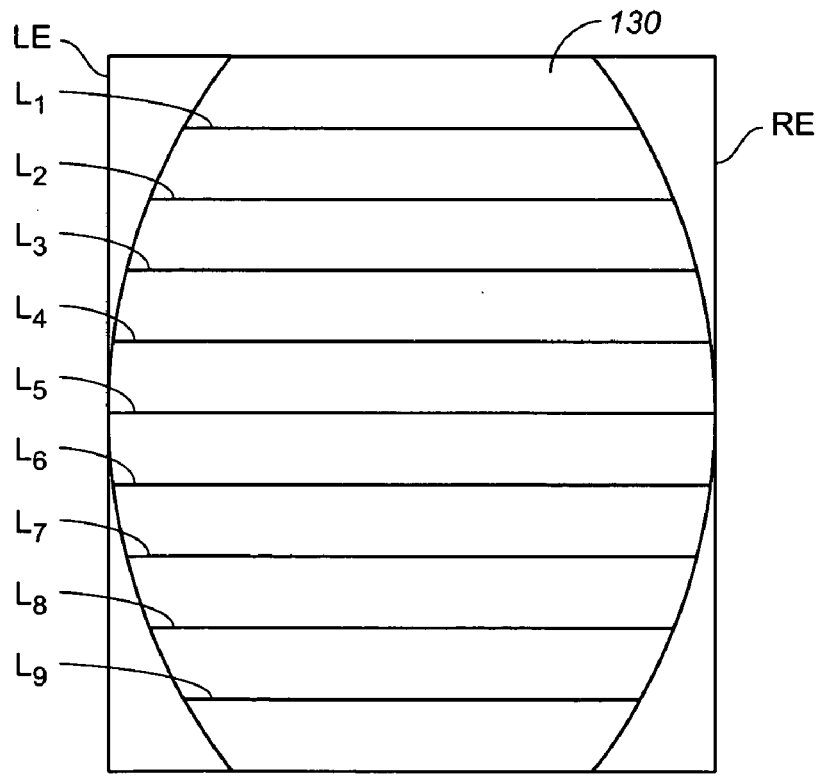
FIG._2C

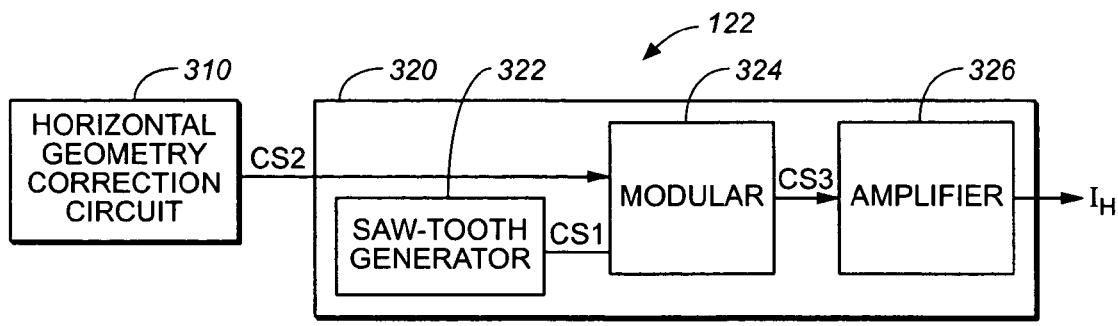
FIG._3A
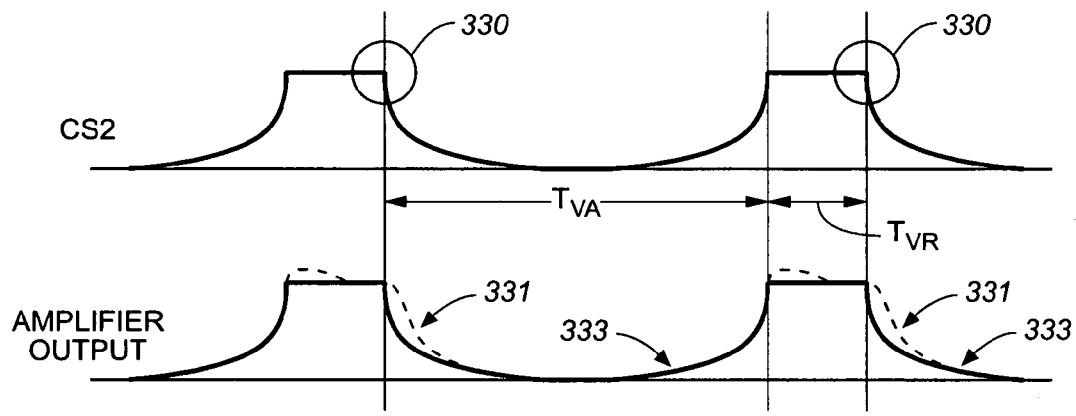
FIG._3B
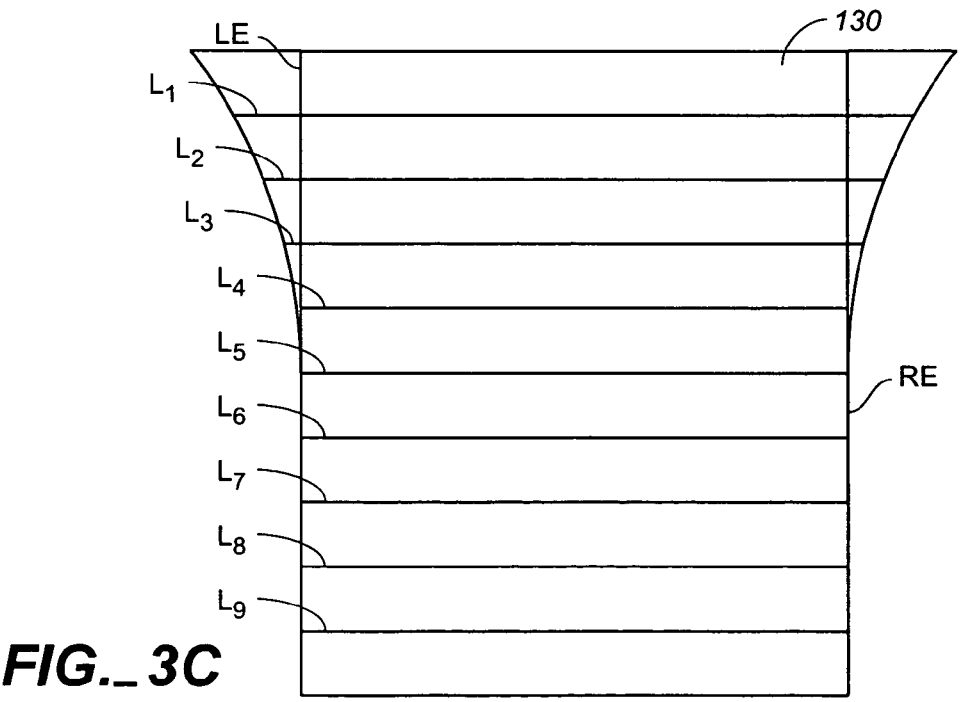
FIG._3C

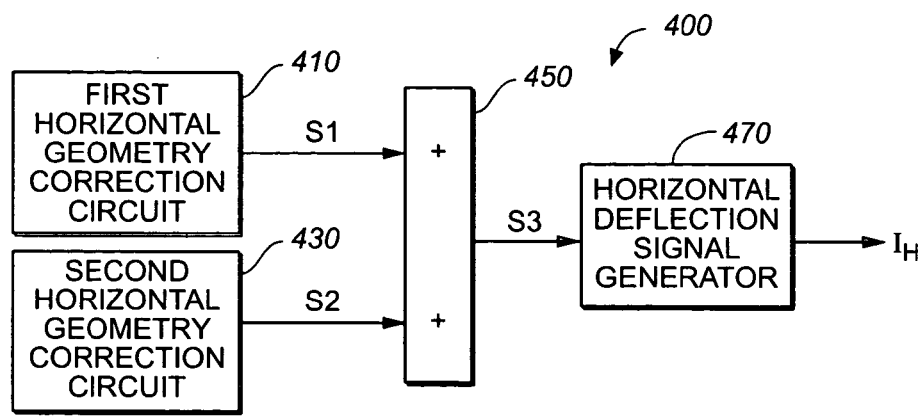
FIG._4
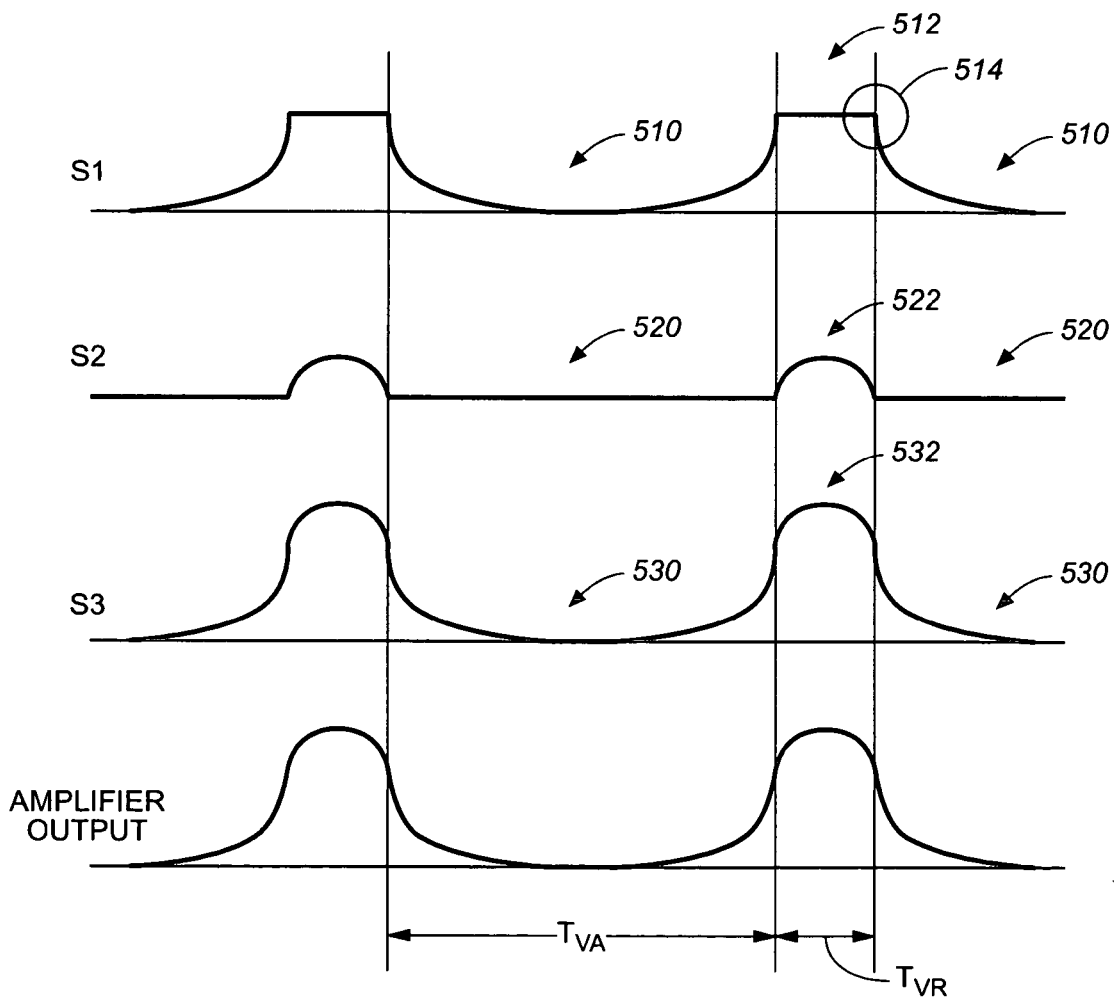
FIG._5

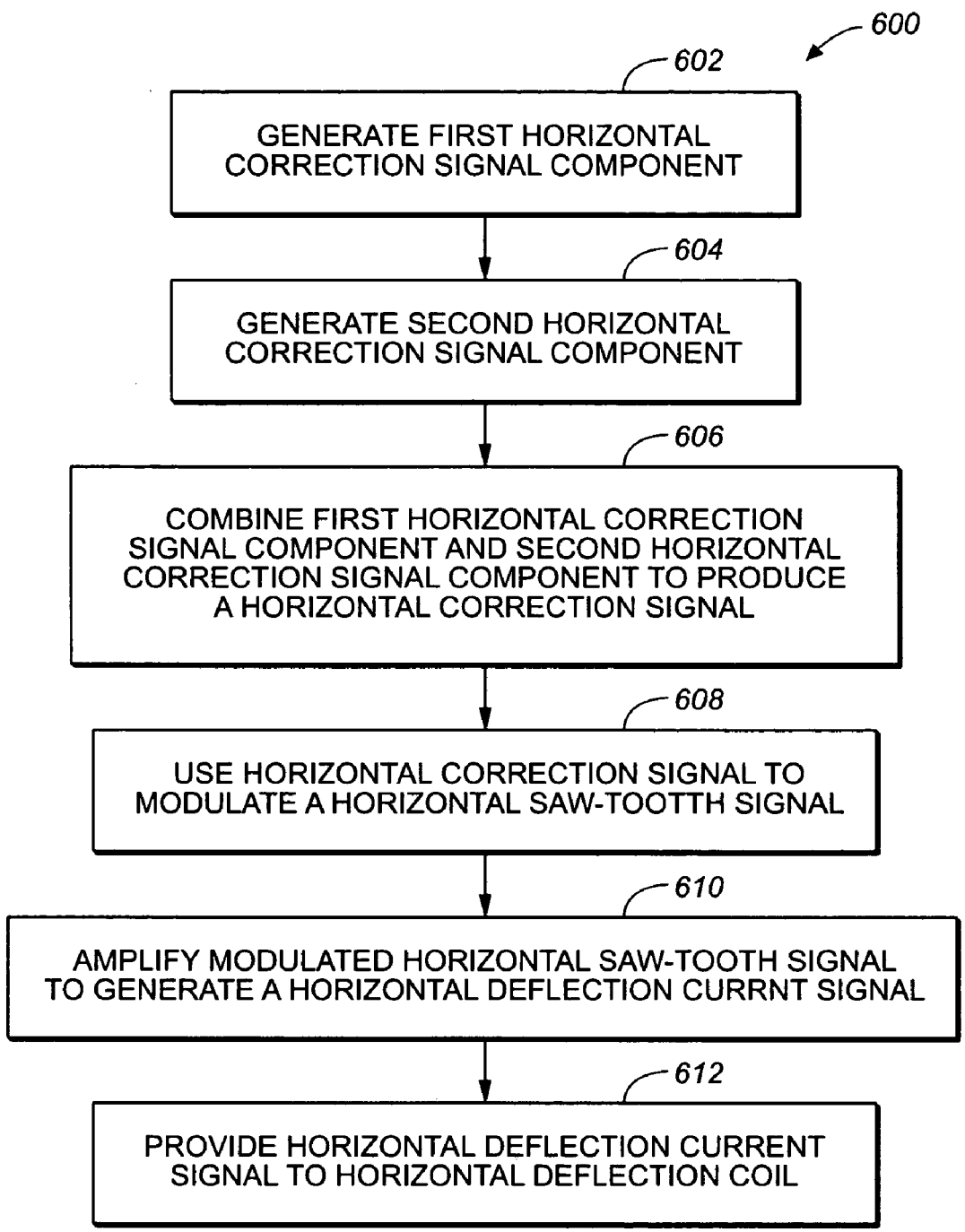
FIG._6

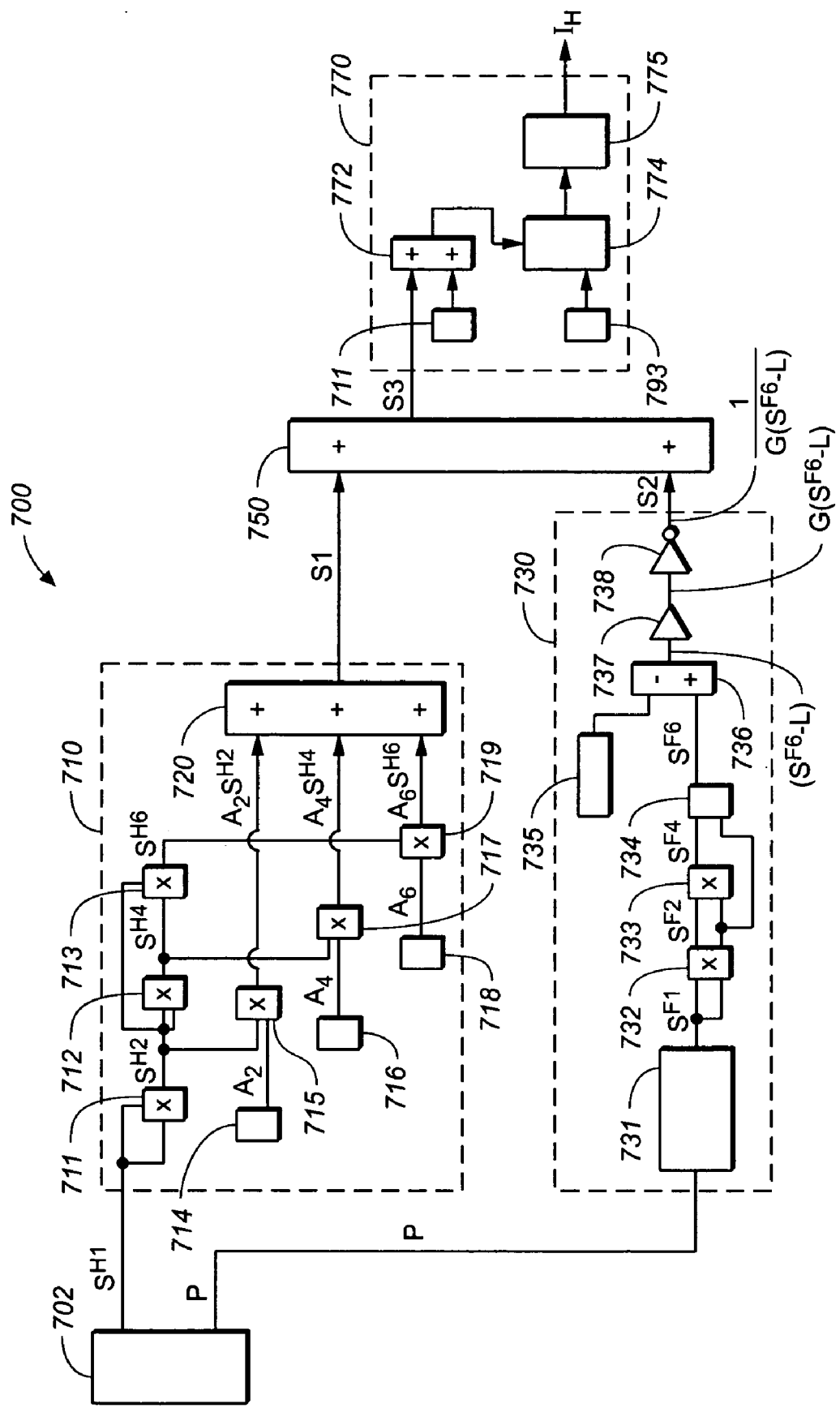
FIG._7

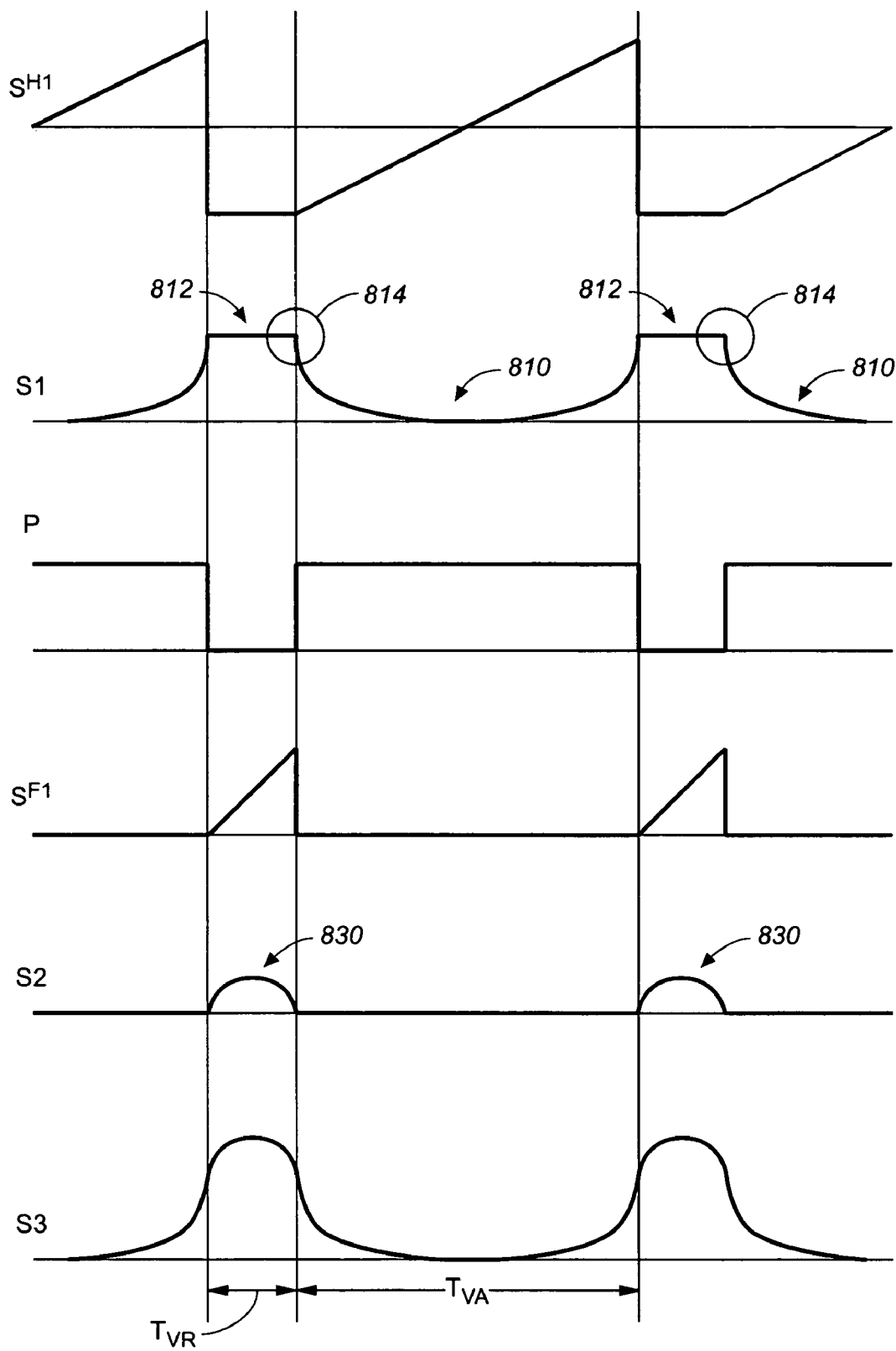
FIG._8

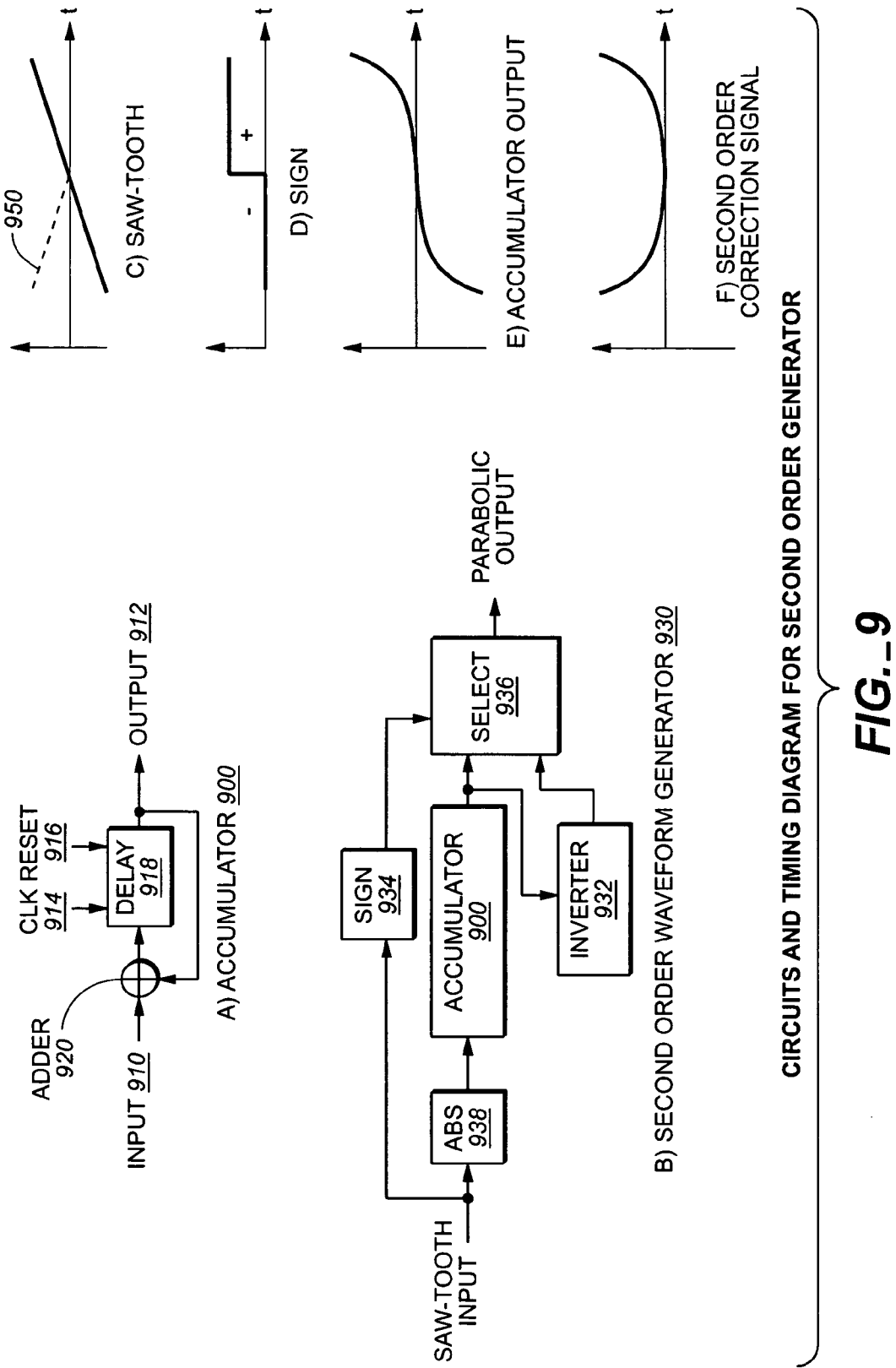
FIG._9 CIRCUITS AND TIMING DIAGRAM FOR SECOND ORDER GENERATOR

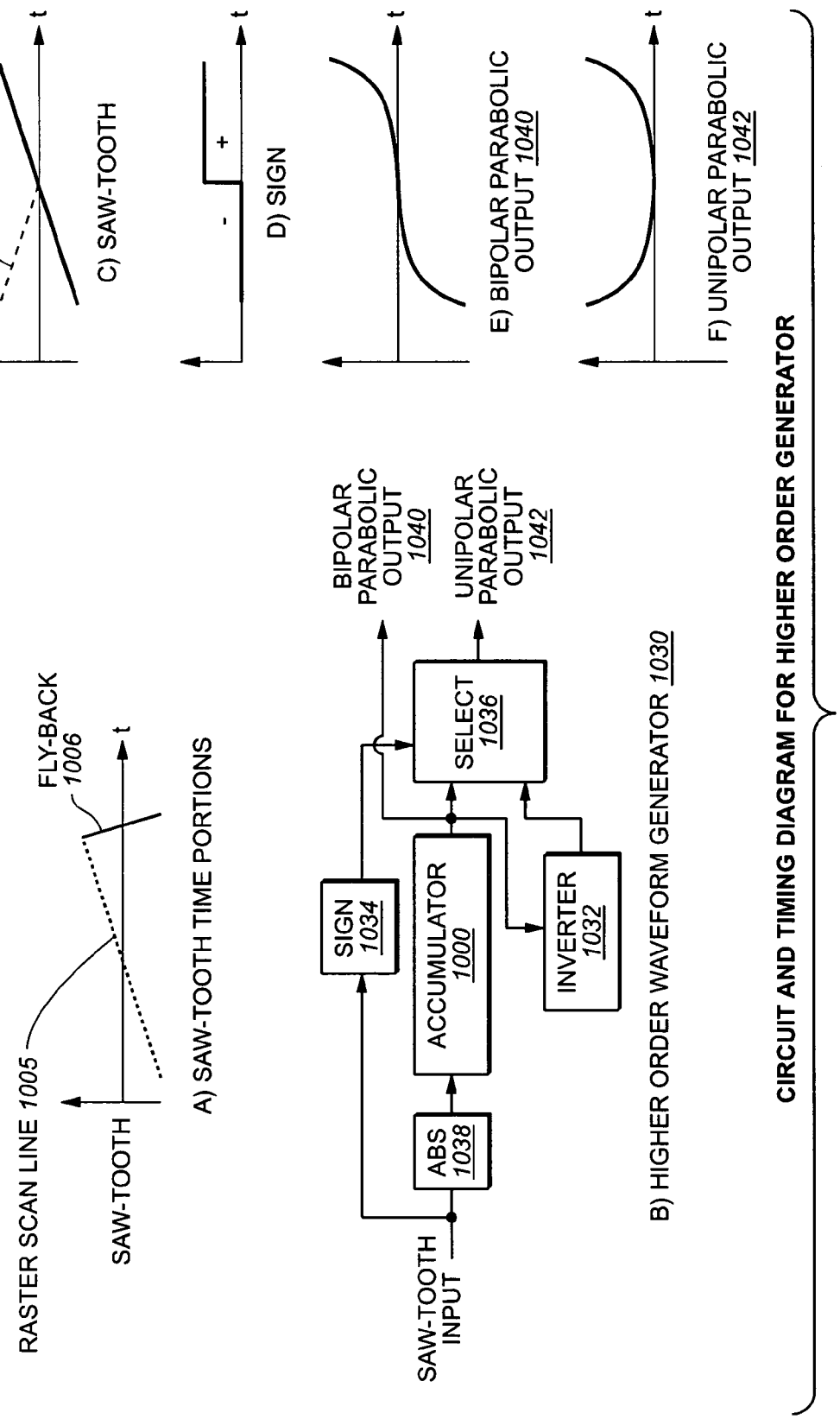
FIG._10 CIRCUIT AND TIMING DIAGRAM FOR HIGHER ORDER GENERATOR

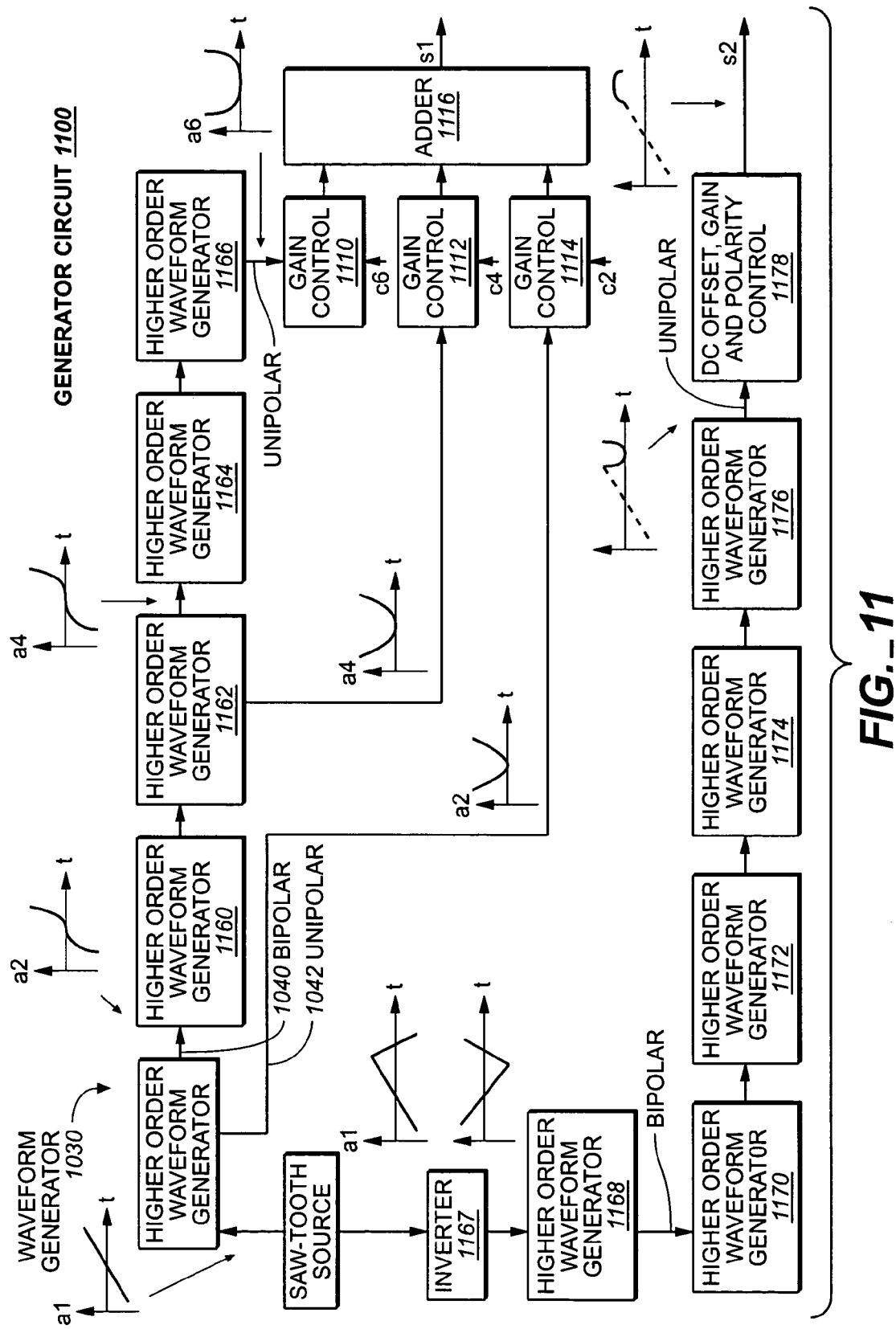
FIG._11

CIRCUIT AND METHOD FOR REDUCING EAST-WEST GEOMETRY MISMATCH BETWEEN THE TOP AND BOTTOM OF A RASTER DISPLAY

CROSS-REFERENCE TO RELATED APPLICATIONS

This application is a continuation-in-part of U.S. application Ser. No. 10/820,237, filed Apr. 5, 2004, which in turn is a continuation of U.S. application Ser. No. 10/003,824, now U.S. Pat. No. 6,717,377 B1, filed Oct. 31, 2001. These patent documents are incorporated herein in their entirety for all purposes by this reference.

FIELD OF THE INVENTION

The present invention relates to raster display systems and, more particularly, to a circuit and method for reducing east-west geometry mismatch between the top and bottom of a raster display.

BACKGROUND OF THE INVENTION

Related Art

Raster display systems are used in a variety of applications such as televisions and computer displays. FIG. 1A shows a cross-sectional side view of a conventional raster display system 100. Raster display system 100 includes an electron gun 110, a deflection system 120, and a screen 130. Electron gun 110 generates and accelerates an electron beam 115 toward deflection system 120. Deflection system 120 deflects electron beam 115 horizontally and/or vertically at screen 130. Screen 130 includes a phosphor-coated faceplate that glows or phosphoresces when struck by electron beam 115.

Deflection system 120 includes a horizontal deflection generator 122, a horizontal deflection coil 124, a vertical deflection generator 126, and a vertical deflection coil 128. Horizontal deflection coil 124 and vertical deflection coil 128 are collectively referred to as the yoke. Although not shown, horizontal deflection coil 124 and vertical deflection coil 128 are wound at a ninety-degree angle relative to one another.

Horizontal deflection generator 122 generates a horizontal deflection current signal $I_H$. When horizontal deflection current signal $I_H$ passes through horizontal deflection coil 124, a magnetic field is created that deflects electron beam 115 horizontally. The horizontal angle of deflection (not shown) is proportional to the direction and the magnitude of horizontal deflection current signal $I_H$. Similarly, vertical deflection generator 126 generates a vertical deflection current signal $I_V$. When vertical deflection current signal $I_V$ passes through vertical deflection coil 128, a magnetic field is created that deflects electron beam 115 vertically. The vertical angle of deflection θ is proportional to the direction and the magnitude of vertical deflection current signal $I_V$.

FIG. 1B is a front view of raster display system 100. Deflection system 120 deflects electron beam 115 from a left edge LE of screen 130 to a right edge RE of screen 130 to draw a first line $L_1$. Electron beam 115 is then briefly turned off, moved downward, and brought back to left edge LE of screen 130 by deflection system 120. Electron beam 115 is then turned on and deflection system 120 deflects electron beam 115 from left edge LE of screen 130 to right edge RE of screen 130 to draw a second line $L_2$. This process continues very rapidly so that lines $L_3$ through $L_N$ (where N=1, 2, 3, . . . , N) are drawn thereby creating an raster on screen 130. Note that the raster drawn on the screen 130 shown in FIG. 1B is ideal since lines $L_N$ extend to, but not beyond, left edge LE and right edge RE.

FIG. 2A shows a conventional horizontal deflection generator 122. Horizontal deflection generator 122 includes a sawtooth generator 210 and an amplifier 220. Sawtooth generator 210 generates a horizontal sawtooth signal CS1 having a constant amplitude. FIG. 2B shows a waveform for horizontal sawtooth signal CS1. Horizontal sawtooth signal CS1 is amplified by amplifier 220, which outputs horizontal deflection current signal $I_H$.

In FIG. 2B, horizontal active time $t_{HA}$ corresponds to the time when electron beam 115 starts drawing a line $L_N$ at left edge LE of screen 130 to the time when electron beam 115 stops drawing a line $L_N$ at right edge RE of screen 130. The horizontal retrace time $t_{HR}$ corresponds to the time when electron beam 115 stops drawing a line $L_N$ at right edge RE of screen 130, moves from right edge RE of screen 130 back to left edge LE of screen 130, and starts drawing another line $L_N$.

One problem with using horizontal sawtooth signal CS1 for horizontal deflection current signal $I_H$ is that it produces a distorted raster. FIG. 2C shows a distorted raster. Lines $L_N$ at the top portion of screen 130 and the lines $L_N$ at the bottom portion of screen 130 do not extend all the way to the left edge LE of screen 130 or all the way to the right edge RE of screen 130 which produces a distorted raster. Note that the distortions may have opposite phase, depending on the particular physical implementation. In this case, the top and bottom of the raster will be wider than the middle of the raster.

FIG. 3A shows a conventional horizontal deflection generator 122' that can be used to address the problems shown in FIG. 2C. Horizontal deflection generator 122' includes a horizontal geometry correction circuit 310 and a horizontal deflection signal generator 320. Horizontal deflection signal generator 320 includes a horizontal sawtooth generator 322, a modulator 324, and an amplifier 326. Horizontal geometry correction circuit 310 generates a correction signal CS2. FIG. 3B shows a waveform for correction signal CS2. Horizontal sawtooth generator 322 generates a horizontal sawtooth signal CS1 having a constant amplitude (as shown in FIG. 2B). Correction signal CS2 modulates the amplitude of horizontal sawtooth signal CS1 via modulator 324. Modulator 324 outputs a horizontal deflection signal CS3 (not shown), which is amplified by amplifier 326. Amplifier 326 then outputs horizontal deflection current signal $I_H$.

In FIG. 3B, the vertical active time $T_{VA}$ corresponds to the time when electron beam 115 starts drawing the first line $L_1$ at the top left of screen 130 to the time when electron beam 115 stops drawing the last line $L_N$ at the bottom right of screen 130. The vertical retrace time $T_{VA}$ corresponds to the time when electron beam 115 stops drawing the last line $L_N$ at the bottom right of screen 130 to the time when electron beam 115 starts drawing the first line $L_1$ at the top left of screen 130.

A problem with using horizontal deflection signal CS3 for horizontal deflection current signal $I_H$ is that it produces asymmetry between the top and bottom of the raster on screen 130. FIG. 3C shows such a raster. Note that lines $L_N$ at the top portion of screen 130 extend beyond left edge LE and right edge RE. This results in an east-west (or left-right) geometry mismatch between the top and bottom of screen 130.

The reason that lines $L_N$ at the top portion of screen 130 extend beyond left edge LE and right edge RE is explained below. Horizontal deflection signal CS3 includes two components: horizontal sawtooth signal CS1 and correction signal CS2. When horizontal deflection signal CS3 is amplified by amplifier 326, amplifier 326 distorts the correction signal component CS2 of horizontal deflection signal CS3. In particular, amplifier 326 distorts a discontinuous portion 330 of correction signal CS2, creating a distorted signal portion 331. FIG. 3B shows a waveform for an amplifier output signal corresponding to correction signal component CS2. The reason amplifier 326 distorts discontinuous portion 330 is because amplifier 326 has a limited frequency bandwidth. Note that amplifier 326 eventually outputs a non-distorted signal portion 333.

Distorted signal 331 causes the amplitude of horizontal deflection current signal $I_H$ to increase at the time the lines $L_N$ are being drawn at the top portion of screen 130. As a result, the lines $L_N$ that are drawn at the top portion of screen 130 extend beyond left edge LE and right edge RE. Once amplifier 326 begins to output non-distorted signal portion 333, the amplitude of horizontal deflection current signal $I_H$ is not distorted and thus the lines $L_N$ that are drawn extend to, but not beyond, left edge LE and right edge RE of screen 130. Since the lines $L_N$ drawn at the top portion of screen 130 extend beyond left edge LE and right edge RE, while the lines $L_N$ drawn at the middle and bottom portions of screen 130 extend to, but not beyond, left edge LE and right edge RE, an east-west geometry mismatch between the top and bottom of screen 130 is created.

Accordingly, what is needed is a circuit and method for reducing east-west geometry mismatch between the top and bottom of a raster display.

SUMMARY OF THE INVENTION

The present invention provides a circuit and method for reducing east-west geometry mismatch between the top and bottom of a raster display. This is accomplished by generating a horizontal correction signal that does not have any discontinuities. Since there are no discontinuities in the horizontal correction signal, the horizontal deflection current signal will not be distorted. As a result, there will be no east-west geometry mismatch between the top and bottom of the raster display.

In one embodiment, a circuit for reducing east-west geometry mismatch between the top and bottom of a raster display is provided. The circuit includes a first signal generator operable to generate a first signal having a parabolic portion, a second signal generator operable to generate a second signal having a parabolic portion, and a signal combiner operable to generate a third signal by combining the first signal and the second signal so that the parabolic portion of the first signal is continuous with the parabolic portion of the second signal.

In another embodiment, a method for reducing east-west geometry mismatch between the top and bottom of a raster display is provided. The method includes generating a first signal having a parabolic portion, generating a second signal having a parabolic portion, and generating a third signal by combining the first signal and the second signal so that the parabolic portion of the first signal is continuous with the parabolic portion of the second signal.

In another embodiment, a circuit for reducing east-west geometry mismatch between the top and bottom of a raster display is provided. The circuit includes a first signal generator operable to generate a first horizontal correction signal component having a parabolic portion, a second signal generator operable to generate a second horizontal correction signal component having a parabolic portion, a signal combiner operable to generate a horizontal correction signal by combining the first horizontal correction signal component and the second horizontal correction signal component such that the horizontal correction signal is a continuous signal, and an amplifier operable to amplify the horizontal correction signal, wherein the horizontal correction signal will not be distorted when amplified by the amplifier since the horizontal correction signal is a continuous signal. In some examples, the first and second signal generators may include multipliers to generate higher order signals such as parabolas. In other examples, the first and second signal generators may include accumulators that integrate a signal of one order to provide a signal of a higher order. Thus, a second order signal may be converted to a third order signal.

In another embodiment, a method for reducing east-west geometry mismatch between the top and bottom of a raster display is provided. The method includes generating a horizontal correction signal, wherein the horizontal correction signal is a continuous signal that will not be distorted when amplified.

Other embodiments, aspects, and advantages of the present invention will become apparent from the following descriptions and the accompanying drawings.

BRIEF DESCRIPTION OF THE DRAWINGS

For a more complete understanding of the present invention and for further embodiments, aspects, and advantages, reference is now made to the following description taken in conjunction with the accompanying drawings, in which:

FIG. 1A shows a cross-sectional side view of a conventional raster display system.

FIG. 1B is a front view of a conventional raster display system.

FIG. 2A shows a conventional horizontal deflection generator.

FIG. 2B shows a waveform for a horizontal sawtooth signal having a constant amplitude.

FIG. 2C shows a low-quality raster that results from using the horizontal sawtooth signal of FIG. 2B for the horizontal deflection current.

FIG. 3A shows a conventional horizontal deflection generator that can be used to address the problem shown in FIG. 2C.

FIG. 3B shows waveforms for an amplitude correction signal and a distorted amplifier output signal.

FIG. 3C shows a low-quality raster that results from using the a sawtooth signal modulated by the amplitude correction signal of FIG. 3B for the horizontal deflection current.

FIG. 4 shows a block diagram of a horizontal deflection generator circuit, according to some embodiments of the present invention.

FIG. 5 shows waveforms for a first horizontal correction signal component, a second horizontal correction signal component, a horizontal correction signal, which is generated by combining the first horizontal correction signal component and the second horizontal correction signal component, and an amplifier output signal, according to some embodiments of the present invention.

FIG. 6 shows a flow diagram of a method for reducing east-west geometry mismatch between the top and bottom of a raster display, according to some embodiments of the present invention.

FIG. 7 shows a schematic diagram of a horizontal deflection generator circuit, according to some embodiments of the present invention.

FIG. 8 shows waveforms for some of the signals within the horizontal deflection generator circuit of FIG. 7.

FIG. 9 shows circuits and timing diagrams for a second order wave generator.

FIG. 10 shows circuits and timing diagrams for a higher order wave generator.

FIG. 11 shows a generator circuit using higher order waveform generator of FIG. 10.

DETAILED DESCRIPTION OF THE INVENTION

The preferred embodiments of the present invention and their advantages are best understood by referring to FIGS. 4 through 8 of the drawings. Like reference numerals are used for like and corresponding parts of the various drawings.

Circuit for Reducing; East-West Geometry Mismatch Between the Top and Bottom of A Raster Display FIG. 4 shows a block diagram of a horizontal deflection generator circuit 400, according to some embodiments of the present invention. Horizontal deflection generator circuit 400 can be used to reduce east-west geometry mismatch between the top and bottom of a raster display. Horizontal deflection generator circuit 400 includes a first horizontal geometry correction circuit 410, a second horizontal geometry correction circuit 430, a signal combiner 450, and a horizontal deflection signal generator 470. Horizontal deflection generator circuit 400 can be implemented in hardware, firmware/microcode, software, or any combination thereof. Additionally, horizontal deflection generator circuit 400 can be implemented on a single integrated circuit device.

First horizontal geometry correction circuit 410 generates a first horizontal correction signal component $S_1$. FIG. 5 shows a waveform for first horizontal correction signal component $S_1$. First horizontal correction signal component $S_1$ has a parabolic portion 510 and an undefined portion 512. The parabolic portion 510 corresponds to vertical active time $T_{VA}$, that is, the time when the electron beam starts drawing the first line at the top left of the raster display to the time when the electron beam stops drawing the last line at the bottom right of the raster display. Undefined portion 512 corresponds to vertical retrace time $T_{VR}$, that is, the time when the electron beam stops drawing the last line at the bottom right of the raster display to the time when the electron beam starts drawing the first line at the top left of the raster display. Parabolic portion 510 is used to modulate the amplitude of a horizontal sawtooth signal (not shown) that is used for the horizontal deflection current signal $I_H$.

As explained above, using first horizontal correction signal component $S_1$ to modulate the amplitude of a horizontal sawtooth signal is undesirable since there is a discontinuity 514 between undefined portion 512 and parabolic portion 510. In particular, when first horizontal correction signal component $S_1$ is amplified, discontinuity 514 causes the signal output from the amplifier to be distorted. As a result, horizontal deflection current signal $I_H$ will be distorted resulting in an east-west geometry mismatch between the top and bottom of a raster display (as shown in FIG. 3C).

The present invention overcomes this problem by using second horizontal geometry correction circuit 430 to generate a second horizontal correction signal component $S_2$. FIG. 5 shows a waveform for a second horizontal correction signal component $S_2$. Second horizontal correction signal component $S_2$ has a parabolic portion 522 and an undefined portion 520. Undefined portion 520 corresponds to vertical active time $T_{VA}$ and parabolic portion 522 corresponds to vertical retrace time $T_{VR}$.

Signal combiner 450 combines first horizontal correction signal component $S_1$ with second horizontal correction signal component $S_2$ to produce horizontal correction signal $S_3$. In particular, signal combiner 450 combines first horizontal correction signal component $S_1$ with second horizontal correction signal component $S_2$ such that a parabolic portion 510 of first horizontal correction signal component $S_1$ is continuous with a parabolic portion 522 of second horizontal correction signal component $S_2$ to produce horizontal correction signal $S_3$ having a first parabolic portion 530 that is continuous with a second parabolic portion 532. FIG. 5 shows a waveform for a horizontal correction signal $S_3$. Horizontal correction signal $S_3$ includes first parabolic portion 530 that is continuous with a second parabolic portion 532. First parabolic portion 530 corresponds to vertical active time $T_{VA}$ and second parabolic portion 532 corresponds to vertical retrace time.

Horizontal deflection signal generator 470 uses horizontal correction signal $S_3$ to modulate a horizontal sawtooth signal that is generated within horizontal deflection signal generator 470. The modulated horizontal sawtooth signal is then amplified and outputted as horizontal deflection current signal $I_H$. Since there are no discontinuities between first parabolic portion 530 and second parabolic portion 532, horizontal deflection current signal $I_H$ will not be distorted. As a result, there will be no east-west geometry mismatch between the top and bottom of the raster display It should be recognized that horizontal deflection generator circuit 400 can include other horizontal geometry correction circuits. For example, horizontal deflection generator circuit 400 may include a third horizontal geometry correction circuit that can produce a vertical sawtooth signal that can be used to modulate the horizontal sawtooth signal and thus correct trapezium geometry errors.

Method for Reducing East-West Geometry Mismatch Between the Top and Bottom of A Raster Display FIG. 6 shows a flow diagram of a method 600 for reducing east-west geometry mismatch between the top and bottom of a raster display, according to some embodiments of the present invention. Method 600 can be performed in hardware, firmware/microcode, software, or any combination thereof. Additionally, method 600 can be performed on a single integrated circuit device.

In step 602, a first horizontal correction signal component $S_1$ is generated. The first horizontal correction signal component can, for example, be generated by first horizontal geometry correction circuit 410.

In step 604, a second horizontal correction signal component $S_2$ is generated. The second horizontal correction signal component can, for example, be generated by second horizontal geometry correction circuit 430.

In step 606, first horizontal correction signal component $S_1$ and second horizontal correction signal component $S_2$ are combined to produce horizontal correction signal $S_3$. First horizontal correction signal component $S_1$ and second horizontal correction signal component $S_2$ are combined such that there are no discontinuities in horizontal correction signal $S_3$. First horizontal correction signal component $S_1$ and second horizontal correction signal component $S_2$ can, for example, be combined using signal combiner 450.

In step 608, horizontal correction signal $S_3$ is used to modulate a horizontal sawtooth signal and thus produce a modulated horizontal deflection signal. Horizontal correction signal $S_3$ can, for example, modulate the horizontal sawtooth signal using horizontal deflection signal generator 470.

In step 610, the modulated horizontal correction signal is amplified to produce a horizontal deflection current signal $I_H$. The modulated horizontal correction signal can, for example, be amplified by an amplifier within horizontal deflection signal generator 470 to produce a horizontal deflection current signal $I_H$.

In step 612, horizontal deflection current signal $I_H$ is provided to a horizontal deflection coil in a raster display system. Since there are no discontinuities in horizontal correction signal $S_3$, horizontal deflection current signal $I_H$ will not be distorted. As a result, there will be no east-west geometry mismatch between the top and bottom of the raster display.

Detailed Circuit for Reducing East-West Geometry Mismatch Between the Top And Bottom of A Raster Display FIG. 7 shows a schematic diagram of a horizontal deflection generator circuit 700, according to some embodiments of the present invention. Horizontal deflection generator circuit 700 includes a horizontal first-order signal generator 702, a first horizontal geometry correction circuit 710, a second horizontal geometry correction circuit 730, a signal combiner 750, and a horizontal correction signal generator circuit 770. Horizontal deflection generator circuit 700 can be implemented in hardware, firmware/microcode, software, or any combination thereof. Additionally, horizontal deflection generator circuit 700 can be implemented on a single integrated circuit device or integrated with other circuits on a single integrated circuit device. To clarify the operation of horizontal deflection generator circuit 700, FIG. 8 shows waveforms for some of the signals generated within horizontal deflection generator circuit 700.

First horizontal geometry correction circuit 710 includes multipliers 711, 712, and 713, an amplitude signal generator 714, a multiplier 715, an amplitude signal generator 71.6, a multiplier 717, an amplitude signal generator 718, a multiplier 719, and a signal combiner 720.

In operation, multiplier 711 multiplies a horizontal first-order signal $S^{H1}$ with itself to produce a horizontal second-order signal $S^{H2}$. Horizontal first-order signal $S^{H1}$ is generated by horizontal first-order signal generator 702. A waveform for horizontal first-order signal $S^{H1}$ is shown in FIG. 8. Multiplier 712 multiplies horizontal second-order signal $S^{H2}$ with itself to produce a horizontal fourth-order signal $S^{H4}$. Multiplier 713 multiplies horizontal second-order signal $S^{H2}$ with horizontal fourth-order signal $S_{H4}$ to produce a horizontal sixth-order signal $S^{H6}$. Amplitude signal generators 714, 716, and 718 generate amplitude signals $A_2$, M, and $A_6$, respectively.

Multiplier 715 multiplies horizontal second-order signal $S^{H2}$ with amplitude signal $A_2$ to generate a horizontal second-order signal component $A_2 S^{H2}$. Multiplier 717 multiplies horizontal fourth-order signal $S^{H4}$ with amplitude signal A4 to generate a horizontal fourth-order signal component $A_4 S^{H4}$. Multiplier 719 multiplies horizontal sixth-order signal $S^{H6}$ with amplitude signal A6 to generate a horizontal sixth-order signal component $A_6 S^{H6}$. Signal combiner 720 sums horizontal second-order signal component $A_2 S^{H2}$, horizontal fourth-order signal component $A_4 S^{H4}$, and horizontal sixth-order signal component $A_6 S^{H6}$ together to produce first horizontal correction signal component SI. A waveform for first horizontal correction signal component SI is shown in FIG. 8.

As explained above, using first horizontal correction signal component SI to modulate the amplitude of a horizontal sawtooth signal is undesirable since there is a discontinuity 814 between undefined portion 812 and parabolic portion 810. In particular, when first horizontal correction signal component SI is amplified, discontinuity 514 causes the output of the amplifier to be distorted. As a result, horizontal deflection current signal $I_H$ will be distorted resulting in an east-west geometry mismatch between the top and bottom of a raster display (as shown in FIG. 3C).

The present invention overcomes this problem by using second horizontal geometry correction circuit 730 to generate a second horizontal correction signal component S2. Second horizontal geometry correction circuit 730 includes a first-order signal generator 731, multipliers 732, 733, and 734, level shifter 735, signal combiner 736, gain controller 737, and inverter 738.

In operation, first-order signal generator 731 detects the falling edge of a pulse signal P received from horizontal first-order signal generator 704. A waveform for pulse signal P is shown in FIG. 8. The falling edge of pulse signal P causes first-order generator 731 to generate a first-order signal $S^{F1}$. A waveform for first-order signal $S^{F1}$ is shown in FIG. 8. Multiplier 732 multiplies first-order signal $S^{F1}$ with itself to produce a horizontal second-order signal $S^{F2}$. Multiplier 733 multiplies horizontal second-order signal $S^{F2}$ with itself to produce a horizontal fourth-order signal $S^{F4}$. Multiplier 734 multiplies horizontal second-order signal $S^{F2}$ with horizontal fourth-order signal $S^F$ to produce a horizontal sixth-order signal $S^{F6}$. Level shifter 735 generates a level shifting signal L. Level shifter 735 can be programmed to output any predetermined value for level shifting signal L. Signal combiner 736 combines horizontal sixth-order signal $S^{F6}$ with level shifting signal L to shift the level of sixth-order signal thereby producing signal $(S^{F6}-L)$. Gain controller 737 controls the gain G of signal $(S^{F6}-L)$ and produces signal $G(S^{F6}-L)$. Gain controller 737 can be programmed to apply any predetermined gain value to signal $(S^{F6}-L)$. Inverter 738 inverts signal $G(S^{F6}-L)$ and produces a second horizontal correction signal component S2. A waveform for second horizontal correction signal component S2 is shown in FIG. 8.

Signal combiner 750 combines first horizontal correction signal component $S_1$ with second horizontal correction signal component $S_2$ to produce horizontal correction signal $S_3$. A waveform for horizontal correction signal $S_3$ is shown in FIG. 8. It is important to note that the parabolic portion 810 of first horizontal correction signal component $S_1$ is joined with the parabolic portion 830 of second horizontal correction signal component $S_2$ such that horizontal correction signal $S_3$ is a continuous signal. In other words, there are no discontinuities in horizontal correction signal $S_3$.

Horizontal correction signal generator circuit 770 includes a horizontal size generator 771, a signal combiner 772, a horizontal sawtooth generator 773, a modulator 774, and an amplifier 775. In operation, horizontal size generator 771, which is programmable, generates a signal that is used to control the horizontal size of the raster generated on a raster display. Signal combiner 772 combines horizontal correction signal S3 and the signal generated by horizontal size generator 771. Modulator 774 receives a horizontal sawtooth signal from horizontal sawtooth generator 773 and modulates the horizontal sawtooth signal with the signal output from signal combiner 772. Amplifier 775 amplifies the signal output by modulator 774 and outputs horizontal deflection current $I_H$. Since there are not discontinuities in horizontal correction signal S3, horizontal deflection current signal $I_H$ will not be distorted. As such, there will not be an east-west geometry mismatch between the top and bottom of the raster display.

It should be recognized that horizontal deflection generator circuit 700 can include other horizontal geometry correction circuits. For example, horizontal deflection generator circuit 700 may include a third horizontal geometry correction circuit that can produce a vertical sawtooth signal that can be used to modulate the horizontal sawtooth signal and thus correct trapezium geometry errors.

It should also be recognized that the circuits within horizontal deflection generator circuit 700 are merely exemplary circuits. A variety of different circuits, all of which are within the scope of the present invention, can be used for first horizontal geometry correction circuit 710 and for second horizontal geometry correction circuit 730. All that is required is that the circuits generate a horizontal correction signal S3 that has a continuous waveform that is not distorted when amplified.

Horizontal correction signals may be generated using accumulators rather than multipliers. This type of circuit may have the advantage of occupying less space on a chip and thus be cheaper to produce. Multiplier circuits are generally quite large compared to accumulator circuits. Multipliers for circuits using 32-bit logic or greater are particularly costly. Driving down the amount of silicon real estate used, and thereby driving down manufacturing costs, is a constant need in many areas including the design of integrated circuits for display and television applications. Therefore, an alternative embodiment to the example shown in FIG. 7 uses accumulators to provide a correction signal using a reduced amount of substrate area. Such circuits may be used in a variety of applications where a high-order signal is generated from a lower-order signal. For some applications, the input could be any input signal including saw-tooth, sine or other signal.

FIG. 9A shows an example of a digital accumulator 900. An input 910 is provided to accumulator 900. The following example uses a saw-tooth signal provided to input 910. The saw-tooth signal includes a straight-line increasing portion. Input 910 goes into adder 920 and the output of adder 920 goes to a delay 918 that provides a time delayed output 912. Delayed output 912 is returned to adder 920 where delayed output 912 and input 910 are added together by adder 920 so that the input to the delay is the sum of input 910 and delayed output 912. Thus, input 910 provides an increment by which delayed output 912 is increased during a clock cycle to provide an incremented output. Input 910 varies according to the signal provided. Output 912 represents the sum of a set of previous inputs because a value of output 912 is the previous value of output 912 plus an increment determined by input 910. The addition operation may be restarted using a "Reset" signal 916, which sets initial value for the waveform generator. This value is set at the start of every scan line. Thus, generation of a new correction signal is initiated for each line of the display by a reset signal. The output after a reset is set to a predetermined value that may be maintained in a register. A clock signal "Clk" 914 is provided. A clock cycle in clock signal 914 may be used to determine the time delay provided by delay 918. Successive clock cycles in clock signal 914 produce successively incremented values for output 912. Thus, if input 910 has a constant value V, output 912 will have values V, 2V, 3V, 4V, etc for successive clock cycles. The number of clock cycles corresponding to one line scan determines the dynamic range of the correction signal for a given input signal.

FIG. 9B shows second order waveform generator (waveform generator) 930. Waveform generator 930 comprises accumulator 900, an inverter 932, a sign-determining unit 934 and an absolute value determining unit 938. Inverter 932 provides an output that is the opposite of its input. In this case the input of inverter 932 is the output of accumulator 900, so the output of inverter 932 is the inverse of the output of accumulator 900. Sign determining unit 934 provides a digital output that has two possible values depending on whether its input is positive or negative. In an analog circuit this could be achieved using a comparator. In digital circuits a sign bit may be used to indicate whether the signal is positive or negative. Thus, a positive signal may be represented by a "0" output, while a negative signal may be represented by a "1" output, or vice-versa. Accumulator 900, inverter 932 and sign-determining unit 934 are connected together as shown so that the output of accumulator 900 and inverter 932 go to a select circuit 936. The output of select circuit 936 is either the output of accumulator 900 or the output of inverter 932 depending on which is selected. The selection is made according to the signal from sign determining unit 934. The absolute value determining unit 938 provides the absolute value of a saw-tooth signal to accumulator 900. Thus, no negative signal is provided to input 910 and therefore no negative increments are made in accumulator 900. Only positive increments are made in this example. A normalization function may be performed by Gain Control Units 1010–1014.

FIG. 9C shows a graph of a portion of saw-tooth signal provided to waveform generator 930. The graph shows voltage as a function of time for a portion of a saw-tooth signal where the voltage is increasing in a straight line. The voltage starts out as a negative voltage and becomes positive at the mid-point of the portion shown. The dashed line 950 shown in FIG. 9C represents the output of absolute value determining unit 938 which is always positive. This is the signal sent to accumulator 900.

FIG. 9D shows the output of sign determining unit 934. The output is 0 volts when the saw-tooth signal of FIG. 9C is negative but rises to a positive voltage when the saw-tooth signal becomes positive. The voltage level to which this output rises is determined by the standard logic voltage used in the chip.

FIG. 9E shows the output of accumulator 900. The output begins at a negative voltage because a reset initiates the signal level at this point. The signal becomes positive and increases exponentially because the accumulator adds positive increments that are determined by the saw-tooth signal. Thus, the accumulator output initially rises rapidly because the absolute value of the saw-tooth signal is large. The output rises more slowly as the saw-tooth signal approaches zero. As the saw-tooth increases in the positive direction, the output increases more rapidly. Eventually, a reset is triggered at the end of a line scan, and this sets output 912 to the inverse of its last value. That is, output 912 goes from being some positive value to being the negative of that value. Thus, a reset sends the parabolic output from one end of its dynamic range to the other. This returns accumulator 900 to the state it was in at the beginning of the cycle and accumulator 900 begins again for a new line of the raster display.

FIG. 9F shows the output of second order waveform generator 930. The right-hand side of this graph is simply the output of accumulator 900, while the left-hand side is the inverse of the output of accumulator 900 obtained from inverter 932.

The output of an accumulator such as accumulator 900 may be considered an integral of the input of the accumulator over a particular time period. While real digital accumulators work by adding discrete values, if many values are added, the discrete model approaches the differential model. Thus, using discrete values may be modeled by integral equations where a clock speed is sufficiently high. A basic equation that applies to such integration is:

$$\int u^n du = u^{n+1}/n+1 + C \qquad \text{Eqn(1)}$$

The value of the constant C may be set to zero. Thus, for n=2, equation (1) becomes:

$$\int u^2 du = u^3/3 \qquad \text{Eqn(2)}$$

For negative signals, the equation is:

$$\int -(u^n du) = -u^{n+1}/n+1 + C \qquad \text{Eqn(3)}$$

While these integral equations represent continuous functions, the circuit described approximates these equations using discrete rather than continuous values. Input 910 has a straight-line increasing signal that is considered a first order signal because it is in the form y=ax, where a is a constant. The output generated by second order waveform generator 930 is proportional to $x^2$ (x squared). It can be written as $ax^2/2+C$. Therefore, it is considered a second order signal. Higher order signals may also be generated using addition. A parabolic signal of a particular order may provide an input to a waveform generator that produces a parabolic signal of a higher order using an accumulator.

FIG. 10 shows an example of a waveform generator that may be used to generate higher order waveforms. FIG. 10A shows a saw-tooth signal that may be used to produce a correction signal. The saw-tooth signal has two portions, a raster scan line portion 1005 and a fly-back portion 1006. Both of these portions are used to form a correction signal.

FIG. 10B shows a higher order waveform generator 1030 that is similar to second order waveform generator 930 but has two outputs, a bipolar parabolic output 1040 and a unipolar parabolic output 1042. The components of higher order waveform generator 1030 may be the same as those used in second order waveform generator 930. Thus, for example, accumulator 1000 may be the same as accumulator 900. FIGS. 10C–10F show signals that correspond to those shown in FIGS. 9C–9F. The main difference between this example and the example shown in FIG. 9 is that bipolar parabolic output 1040 (the output of accumulator 1000) is provided as an output from higher order waveform generator 1030. This output is shown in FIG. 10E. Bipolar parabolic output 1040 has both negative and positive portions both of which are parabolic in shape.

FIG. 11 shows a block diagram of generator circuit 1100 that may be used to provide correction signals. Generator circuit 100 of FIG. 11 performs the same function as the circuit of FIG. 7, to produce a parabolic curve from a saw-tooth input. However, the circuit of FIG. 11 uses accumulators instead of multipliers and is therefore more efficient in using space on a silicon chip. FIG. 11 shows a saw-tooth source providing a saw-tooth signal to higher order waveform generator 1030. The outputs of generator 1030 are second order parabolic signals 1040, 1042 as previously shown. The bipolar parabolic output 1040 is sent to higher order waveform generator 1160. Higher order waveform generator 1160 performs an integrating operation.

The bipolar parabolic output of higher order waveform generator 1160 is a third order parabolic signal. This is sent to higher order waveform generator 1162, which produces fourth order parabolic signals. The bipolar fourth order parabolic signal is sent to two more higher order waveform generators, 1164, 1166, that produce a sixth order signal. The sixth order unipolar signal is sent to a gain control unit 1110 that multiplies the sixth order signal by a constant to provide an amplified signal to adder 1116. The second order unipolar signal from higher order waveform generator 1030 is sent to gain control unit 1114 where it is amplified and the amplified signal is passed to adder 1116. The fourth order unipolar signal from higher order waveform generator 1162 is sent to gain control 1112, which amplifies the signal. The amplified signal is then passed to adder 1116. Adder 1116 sums the three amplified inputs, the second, fourth and sixth order unipolar signals to produce output s1. Because the three inputs are separately amplified, they may be configured according to the output signal that is desired.

FIG. 11 shows a second correction signal s2 generated from the saw-tooth input. Whereas signal s1 is generated from the raster line scan portion 1005 of the saw-tooth signal, s2 is generated from the fly-back portion 1006 of the saw-tooth signal. Signal s2 may be generated in a similar manner to generating s1 where a bipolar output from one generator is passed to a subsequent generator. An inverted saw-tooth signal is provided by inverter 1167 so that the fly-back portion is an increasing signal going from negative to positive. This inverted signal is passed to a first higher order waveform generator 1168. The bipolar output of higher order waveform generator 1168 is passed to a second higher order waveform generator 1170 the bipolar output of which is in turn passed to the next generator and so on. The unipolar output of the last higher order waveform generator 1176 in the series may then be passed to a unit 1178 that perform DC offset, gain and polarity control. Unit 1178 may include separate components to perform these separate functions. For example, level shifter 735, signal combiner 736, gain controller 737 and inverter 738 may be used to perform these functions in unit 1178.

Comparing FIGS. 7 and 11, it can be seen that the circuitry of FIG. 11 may be made smaller than that of FIG. 7. For example horizontal correction circuit 710 has three multipliers 711–713 to provide second, fourth and sixth order outputs. Each of these multipliers may require as many as 32 adders. In contrast, generator 1000 uses 5 accumulators, sign determining unit 934, inverter 932 and select unit 936. Each accumulator includes an adder and a register. Therefore, the entire circuit may be made using 5 adders and some While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

The invention claimed is:

1. A circuit for reducing east-west geometry mismatch between the top and bottom of a raster display, the circuit comprising:

a first signal generator operable to generate a first horizontal correction signal having a parabolic portion, the first signal generator forming the first horizontal correction signal by addition of discrete values of a first portion of a fundamental signal;

a second signal generator operable to generate a second horizontal correction signal having a parabolic portion; and a signal combiner operable to generate a third signal by combining the first signal and the second signal so that the parabolic portion of the first signal is continuous with the parabolic portion of the second signal.

2. The circuit of claim 1 wherein the second signal generator forms the second horizontal correction signal by addition of discrete values of a second portion of the fundamental signal.

3. The circuit of claim 1 wherein the first signal generator comprises an accumulator and an inverter.

4. The circuit of claim 1 wherein the first signal generator comprises a plurality of accumulators.

5. The circuit of claim 1 wherein the first signal generator comprises a plurality of higher order waveform generators connected in series, an individual higher order waveform generator receiving a signal of order n and producing a signal of order n+1.

6. The circuit of claim 5 wherein the first horizontal correction signal is formed by adding weighted outputs of individual ones of the plurality of higher order waveform generators connected in series.

7. The circuit of claim 1 wherein the fundamental signal is a saw-tooth signal.

8. The circuit of claim 1, wherein the circuit includes a gain controller.

9. The circuit of claim 1, wherein the circuit includes a level shifter.

10. The circuit of claim 1, further comprising:
a third signal generator operable to generate the fundamental signal, wherein the fundamental signal is a saw-tooth signal.

11. A method of generating a signal to correct east-west geometry mismatch between the top and bottom of a raster display, comprising:
generating a fundamental signal, the fundamental signal including a straight-line increasing portion; and
generating a first parabolic signal in response to the straight-line increasing portion of the fundamental signal, thea first parabolic signal value determined from a sum of a set of discrete values of the straight-line increasing portion of the fundamental signal.

12. The method of claim 11, further comprising:
generating a second parabolic signal in response to the first parabolic signal, thea second parabolic signal value determined from a sum of a set of discrete values of the first parabolic signal.

13. The method of claim 11, further comprising:
generating a plurality of parabolic signals of varying order and adding together the plurality of parabolic signals to obtain a correction signal.

14. The method of claim 11, wherein the fundamental signal is a saw-tooth signal.

15. The method of claim 13, further comprising:
modulating the amplitude of the fundamental signal using the correction signal to generate a deflection signal.

16. A circuit for generating a parabolic correction to correct geometry mismatch between the top and bottom of a raster display, comprising:
a first order signal generator that provides a first order signal; and
a second order signal generator that receives the first order signal and produces a second order signal in response to the first order signal, the second order signal generator comprising an accumulator that adds a discrete value of the first order signal to an accumulated value to produce the second order signal.

17. The circuit of claim 16 wherein the accumulated value is a sum of a plurality of discrete values of the first order signal and an offset value.

18. The circuit of claim 16, further comprising:
a plurality of higher order waveform generators connected in series so that an output of a first higher order waveform generator is an input of a second higher order waveform generator, outputs of individual higher order waveform generators added to produce a combined output.

19. The circuit of claim 16, wherein the second order signal generator comprises an inverter.

20. The circuit of claim 18, wherein the combined output is a horizontal correction signal.

* * * * *